(No Model.)
S. H. PHELPS.
JOURNAL BEARING.
No. 592,595. Patented Oct. 26, 1897.
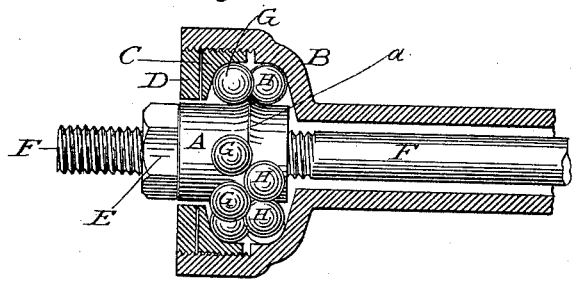
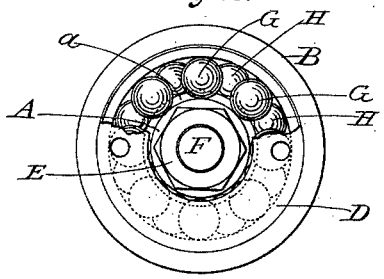
Witnesses,
Inventor,
Spencer H. Phelps,
by Robert W. Hendie
Attorney

UNITED STATES PATENT OFFICE.

SPENCER H. PHELPS, OF JANESVILLE, WISCONSIN.

JOURNAL-BEARING.

SPECIFICATION forming part of Letters Patent No. 592,595, dated October 26, 1897.

Application filed August 19, 1897. Serial No. 648,853. (No model.)

*To all whom it may concern:*

Be it known that I, SPENCER H. PHELPS, a citizen of the United States, residing at Janesville, in the county of Rock and State of Wisconsin, have invented certain new and useful Improvements in Roller-Bearings; and I do hereby declare the following to be a full, clear, and exact description of the invention, such as will enable others skilled in the art to which it appertains to make and use the same.

My invention has for its object to provide a roller-bearing which shall be simple and strong in construction and effective and durable in operation. This I accomplish by the means illustrated in the accompanying drawings, in which—

Figure 1 is a sectional plan view of a roller-bearing embodying my invention. Fig. 2 is a sectional end view of the parts shown in Fig. 1.

As illustrated in the drawings, B represents an outer shell or casing provided on its inner side with an annular way or channel for the bearing-balls H. A shaft F is arranged within the outer shell or casing B and supports a collar A, which is made adjustable on said shaft by means of the threaded end of the shaft F engaging the threaded opening in the collar A, and is held in place on said shaft by means of the jam-nut E. The collar A is provided with a circular ridge *a*, the inner side of which bears against the lower portion of the bearing-balls H and the outer side bears against the lower portion of the bearing-balls G. The bearing-balls are arranged in two series G and H, the balls of each series being separated from each other by the balls of the opposite series.

An outer bearing-ring C is provided with a curved way or channel adapted to bear against the upper portion of the bearing-balls G and is threaded on its outer edge to engage the threaded inner portion of the outer casing or shell B and is held in place by a retaining-washer D, which is also threaded on its outer edge and adapted to engage the threaded inner surface of the outer casing B.

When the parts are in operation, the shaft F may be stationary and the outer casing made to revolve, or the casing B may be stationary and the shaft F made to revolve.

What I claim is—

In a roller-bearing, the combination with an outer casing, of a central shaft, a collar adjustably secured upon said shaft and provided with an annular ridge and ball-bearing surfaces on each side of said ridge, a series of balls bearing on said collar on each side of said ridge, the balls of each series being free from contact with each other but in contact with the balls of the opposite series, a bearing-ring adjustably secured to said casing, and a retaining-washer adapted to bear against said bearing-ring and adjustably secured to said casing, substantially as shown and described.

In testimony whereof I affix my signature in presence of two witnesses.

SPENCER H. PHELPS.

Witnesses:
MAMIE E. QUIRK,
A. A. JACKSON.